(12) United States Patent
McGhie et al.

(10) Patent No.: US 8,157,284 B1
(45) Date of Patent: Apr. 17, 2012

(54) METHOD FOR ALIGNING A TRACTOR WITH A STEERABLE TRAILER AND APPARATUS THEREFOR

(76) Inventors: James R. McGhie, Henderson, NV (US); Robb I. McGhie, Farmington, MN (US)

( * ) Notice: Subject to any disclaimer, the term of this patent is extended or adjusted under 35 U.S.C. 154(b) by 0 days.

(21) Appl. No.: 13/065,670

(22) Filed: Mar. 28, 2011

Related U.S. Application Data (60) Provisional application No. 61/341,842, filed on Apr. 5, 2010.

(51) Int. Cl.
*B62D 53/06* (2006.01)
(52) U.S. Cl. ........... 280/434; 280/432; 280/416.1
(58) Field of Classification Search .......... 280/434, 280/432, 416.1, 418.1, 417.1, 441.1, 441.2, 280/426, 477, DIG. 14
See application file for complete search history.

(56) References Cited

U.S. PATENT DOCUMENTS

| | | | | |
|---|---|---|---|---|
| 3,091,501 A * | 5/1963 | Satrum | ............... | 384/593 |
| 3,701,547 A * | 10/1972 | Goold | ............... | 280/432 |
| 4,457,531 A * | 7/1984 | Hunger | ............... | 280/433 |
| 5,348,332 A * | 9/1994 | Hamilton | ............... | 280/476.1 |
| 8,052,164 B2 * | 11/2011 | Alguera et al. | ............... | 280/422 |
| 2003/0132604 A1 * | 7/2003 | Evans | ............... | 280/438.1 |
| 2011/0115196 A1 * | 5/2011 | Wulff | ............... | 280/477 |

* cited by examiner

*Primary Examiner* — Tashiana Adams
(74) *Attorney, Agent, or Firm* — Ted Masters (57) ABSTRACT

An alignment method and system for connecting a tractor to a steerable trailer includes a connection roller which facilitates the connection by accommodating a variance in fifth wheel to kingpin alignment. The method and system also includes an alignment guide which visually assists the tractor driver in properly aligning the tractor to the interface member of the trailer.

12 Claims, 6 Drawing Sheets

METHOD FOR ALIGNING A TRACTOR WITH A STEERABLE TRAILER AND APPARATUS THEREFOR

CROSS REFERENCE TO RELATED APPLICATION

This application claims the filing benefit under 35 U.S.C. §119(e) of U.S. Provisional Application No. 61/341,842, filed Apr. 5, 2010, which is hereby incorporated by reference.

TECHNICAL FIELD

The present invention pertains generally to a steerable axle trailer which are towed by a tractor, and more particularly to a method for aligning the tractor to the steerable trailer during reconnection.

BACKGROUND OF THE INVENTION

The conventional connection of a tractor to a trailer is effected by a fifth wheel located on the tractor and a kingpin located on the trailer. The kingpin is rotationally received by and locked in place within the fifth wheel. With a steerable trailer things are more complicated. A steerable trailer is steered from the fifth wheel of the tractor with the fifth wheel and kingpin rotationally locked together. As such, when the tractor disconnects from the trailer the steering on the trailer will generally not be in the straight ahead position, but rather at the last steering angle. The steering on the trailer could be pointing right or left. When the tractor re-connects with the trailer the tractor driver must determine the approximate trailer axle steering angle and reverse back at that angle, and not along the centerline of the trailer. The required reverse angle of the tractor can be as much as 45 degrees with respect to the centerline of the trailer, and can present alignment problems for the tractor driver.

BRIEF SUMMARY OF THE INVENTION

The present invention is directed to steerable trailers which are towed by tractors. An alignment guide on an interface member visually assists the tractor driver in reversing at the correct angle for connection to the trailer. Also the interface member includes a speedy connection roller to facilitate the engagement of the kingpin by the fifth wheel.

In accordance with a preferred embodiment, a trailer alignment system is provided for a steerable trailer which is towed by a tractor. The tractor has a fifth wheel having a slot which receives the king pin of the trailer. The alignment system includes an interface member having a bottom surface and an alignment axis, the interface member is rotatably connected to the streerable trailer. The kingpin is disposed on the bottom surface and on alignment axis of the interface member. A connection roller is disposed on the bottom surface and on the alignment axis, the connection roller is spaced apart from the kingpin and is shaped and dimensioned to rollably engage the fifth wheel. When the tractor is backed up to connect to said steerable trailer, said connection roller rollably engages the slot of the fifth wheel and guides the kingpin into the slot of the fifth wheel.

In accordance with another embodiment, an alignment guide is disposed on the interface member, the alignment guide is oriented perpendicular to the alignment axis of the interface member. The alignment guide has a first end which outwardly projects from the interface member, and an opposite second end which outwardly projects in an opposite direction from the interface member.

In accordance with another embodiment, the first and second ends of the alignment guide are selectively extendable.

In accordance with another embodiment, the first end of the alignment guide has a first planar member having a first edge, the first planar member being oriented parallel to the alignment axis of the interface member. And, the second end of the alignment guide has a second planar member having a second edge, the second planar member being oriented parallel to the alignment axis of the interface member.

Other possible embodiments, in addition to the possible embodiments enumerated above, will become apparent from the following detailed description, taken in conjunction with the accompanying drawings, which illustrate, by way of example, the principles of the alignment method and system.

DETAILED DESCRIPTION OF THE INVENTION

Figure 1:
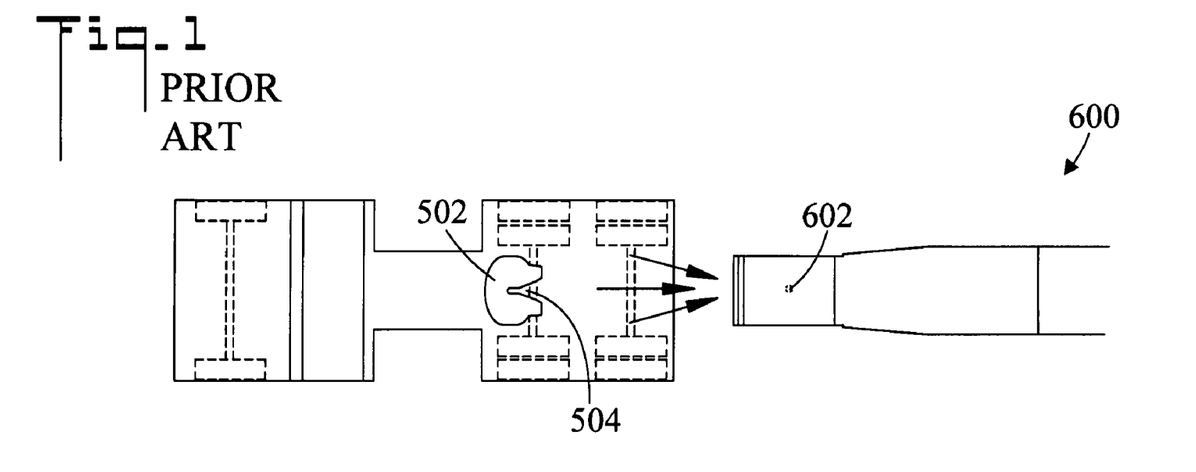
FIG. 1 is a top plan view of a prior art tractor and trailer.
Figure 2:
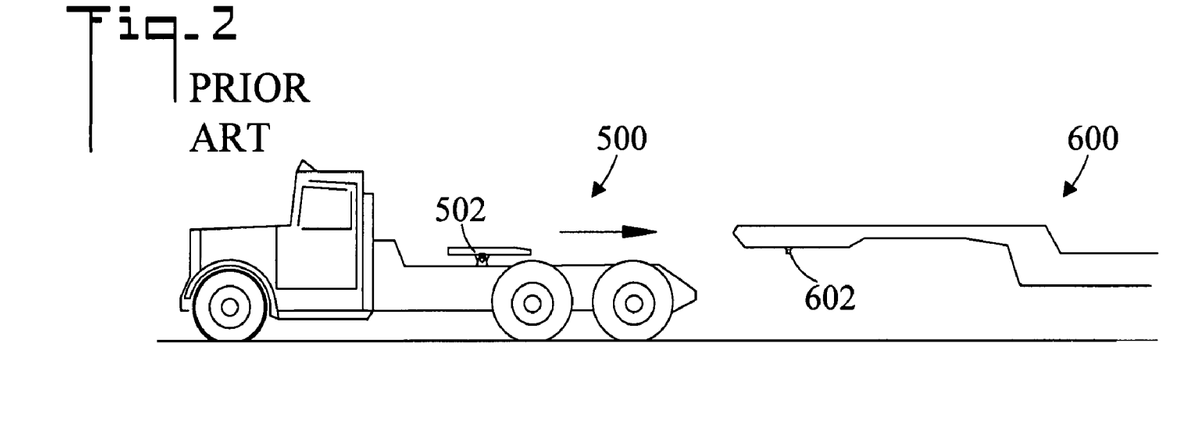
FIG. 2 is as side elevation view of the tractor and trailer of FIG. 1.

Referring initially to FIGS. 1 and 2, there are illustrated top plan and side elevation views respectively of a prior art tractor 500 and trailer 600 (non-steerable). Tractor 500 tows trailer 600, and includes a fifth wheel 502 having a tapered slot 504. Trailer 600 includes a kingpin 602 which is received by slot 504 in fifth wheel 502 and locked in place, but is still free to rotate with respect to fifth wheel 502. Tractor 500 is connected to trailer 600 by backing up tractor so that king pin 602 is received by slot 504. Tractor 500 can approach trailer 500 from different directions (see arrows) and still successfully make the connection.

Figure 3:
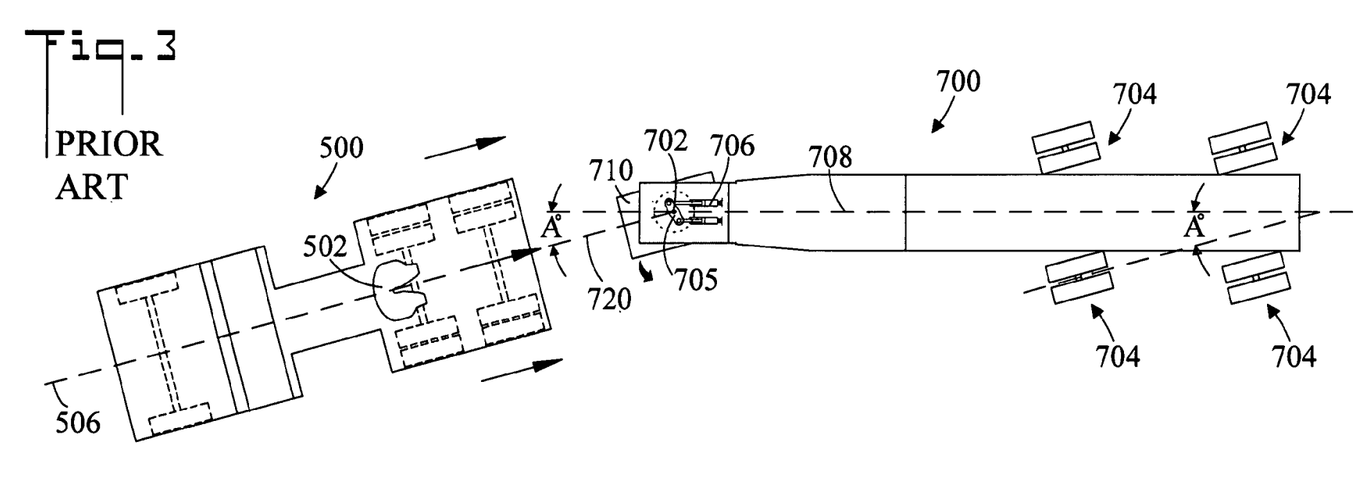
FIG. 3 is a top plan view of a prior art tractor and steerable trailer, showing the tractor backing up to connect to the steerable trailer.
Figure 4:
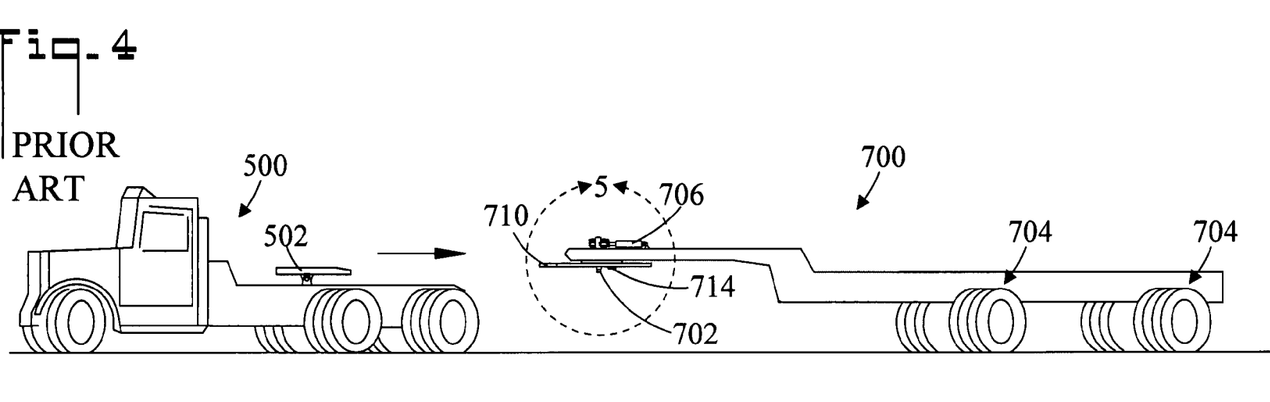
FIG. 4 is a side elevation view of the tractor and steerable trailer of FIG. 3.

Now referring to FIGS. 3 and 4, there are illustrated top plan and side elevation views respectively of a prior art tractor 500 having a centerline 506 and a steerable trailer 700, showing tractor 500 backing up to connect to steerable trailer 700 having a kingpin 702. Steerable trailer 700 differs from conventional trailer 600. When steerable trailer 700 is towed by tractor 500, as tractor 500 steers (turns), the trailer axles 704

(and attached wheels) of steerable trailer 700 will steer proportionally. This steering feature improves steering characteristics of the tractor/trailer combination. A pair of hydraulic sender cylinders 706 disposed on steerable trailer 700 transmit the steering angle A° to the trailer axles 704. This concept is discussed in U.S. Pat. No. 7,686,320 which is included hereby by reference. Steerable trailers 700 are common in Europe, but not in the United States.

However, a problem exists with steerable trailers 700. If tractor 500 disconnects from steerable trailer 700 for another job and then at some time later positions to re-connect to trailer 700 (it would normally line up with the trailer and reverse into it), it must line up with an interface member (see below) at an angle which is the same as the steering angle A° of the trailer steering axles 704 and not along the centerline 708 of steerable trailer 700. When tractor 500 reverses to re-engage with steerable trailer 700, the angle of approach (tractor to trailer) could be from zero degrees to 45 degrees. Under normal circumstance with a conventional trailer 600 tractor 500 reverses inline with the trailer (refer to FIG. 1).

Also referring to FIGS. 5-8, kingpin 702 is fixedly connected to an interface member 710 (sometimes called an interface tray or plate). Interface member 710 is rotatably connected to the front of steerable trailer 700 by a connection bearing 712, which allows interface member 710 to rotate with respect to steerable trailer 700. Kingpin 702 is disposed on the bottom surface of interface member 710. In FIG. 3 it is noted that interface member 710 has rotated counterclockwise with respect to steerable trailer 700. The amount of rotation of interface member 710 determines the steering angle A° of trailer axles 704.

When kingpin 702 of steerable trailer 700 connects to fifth wheel 502, kingpin 702 is not free to rotate as in the conventional non-steerable tractor/trailer arrangement of FIGS. 1 and 2. Rather, a wedge 714 also disposed on the bottom surface 711 of interface member 710 near kingpin 702 engages fifth wheel slot 504, and prevents interface plate 710 and connected kingpin 702 from rotating with respect to fifth wheel 502 (refer to FIG. 8). As such, when tractor 500 turns (steers) kingpin 702 turns with respect to steerable trailer 700. This relative turning action is what causes trailer axles 704 to steer (refer to 5 and the related discussion). However, a problem exists in that wedge 714 generates friction and can even hang-up as tractor 500 attempts to connect to steerable trailer 700 thereby making the connection process difficult. Because of this, in Europe dis-connections and re-connections are keep to a minimum.

Figure 5:
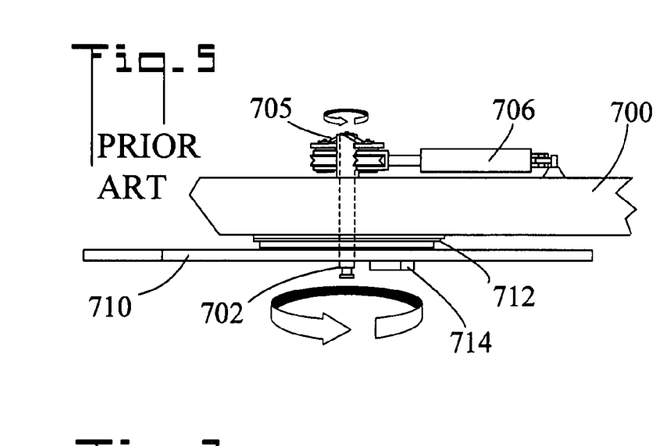
FIG. 5 is an enlarged view of area 5 of FIG. 4.

FIG. 5 is an enlarged view of area 5 of FIG. 4. Interface member 710 is rotatably connected to steerable trailer 700 by connection bearing 712. As tractor 500 (refer to FIG. 3) turns interface member 710 and attached kingpin 702 also turn. Kingpin 702 extends upward and turns an equalizer arm 705 (also refer to FIG. 3) which engages sender cylinders 706. The two rotational arrows show the top portion of kingpin 702 as the lower portion turns with fifth wheel 502. Sender cylinders transmit hydraulic pressure to receiver cylinders located at trailer steering axles 704 and cause the axles to steer to the steering angle A° between interface member 710 and steerable trailer 700. This process is explained in U.S. Pat. No. 7,686,320. To accomplish this, fifth wheel 502 must be rotationally locked to kingpin 702.

Figure 6:
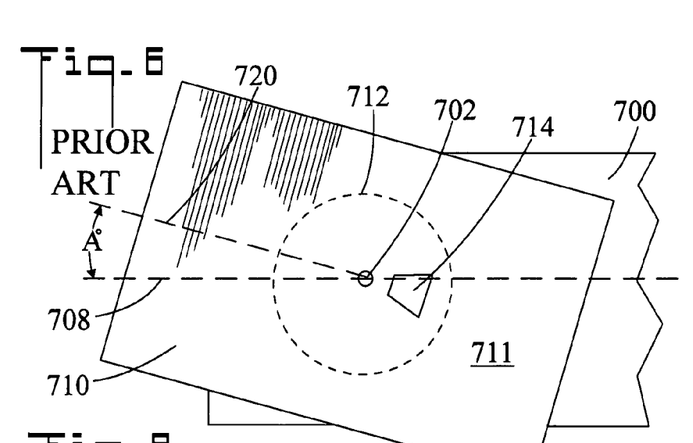
FIG. 6 is an enlarged bottom plan view of the area of FIG. 5.

FIG. 6 is an enlarged bottom plan view of the area of FIG. 5. Kingpin 702 and wedge 714 are fixedly connected to the bottom surface 711 of interface member 710. Interface member 710 rotates with respect to steerable trailer 700 about connection bearing 712. It is noted that the angle between interface member 710 and the centerline 708 of steerable trailer 700 is the steering angle A°, which is transmitted by sender cylinders 706 (refer to FIG. 5) to trailer axles 704.

Figure 7:
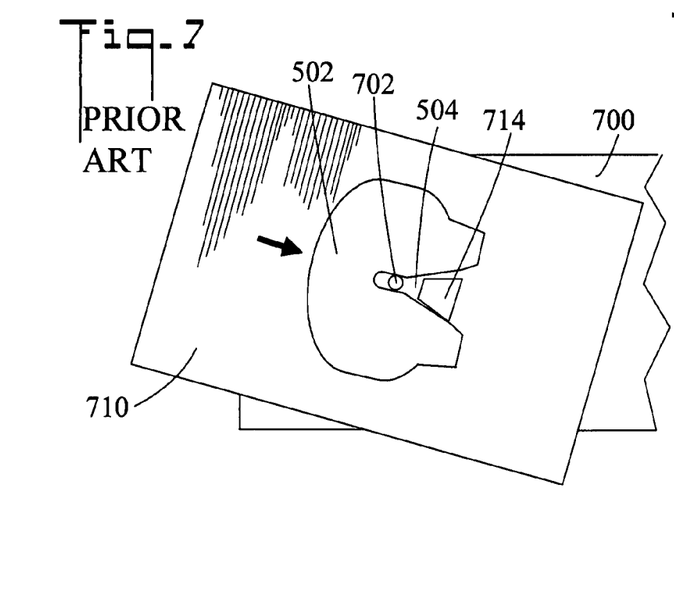
FIG. 7 is an enlarged bottom plan view showing a fifth wheel connecting to the steerable trailer.

FIG. 7 is an enlarged bottom plan view showing fifth wheel 502 connecting to steerable trailer 700. Tractor 500 (refer to FIG. 3) is backed up causing slot 504 of fifth wheel 502 to accept kingpin 702 and wedge 714. However if the alignment of fifth wheel 502 is not correct, wedge 714 can cause friction or even hang up and thereby complicate or prevent the re-connection process, such that the process needs to be repeated with a more accurate alignment. It is noted that the view of FIG. 7 is taken looking up from below fifth wheel 502.

Figure 8:
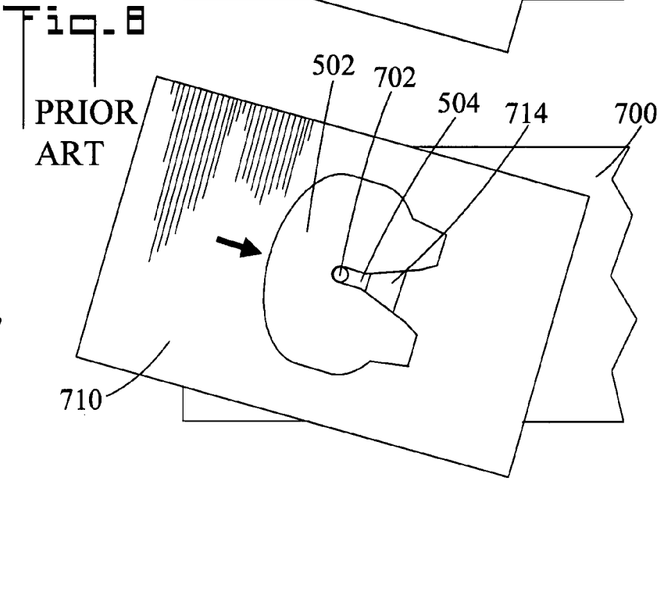
FIG. 8 is an enlarged bottom plan view showing the fifth wheel fully connected to the steerable trailer.

FIG. 8 is an enlarged bottom plan view showing fifth wheel 502 fully connected to steerable trailer 700. Kingpin 502 is disposed at the center of fifth wheel 502, and wedge 714 locks fifth wheel 502 and interface member 710 together.

Figure 9:
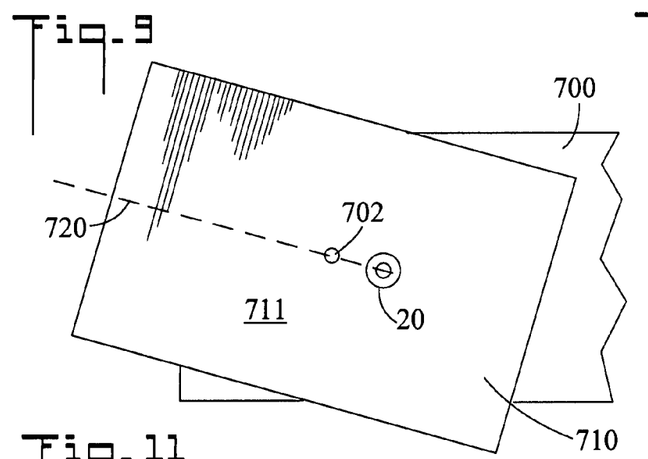
FIG. 9 is an enlarged bottom plan view of a connection roller in accordance with the present invention.

FIG. 9 is an enlarged bottom plan view of a trailer alignment system in accordance with the present invention. The trailer alignment system includes a connection roller 20. Interface member 710 has a bottom surface 711 and alignment axis 720, and is rotatably connected to streerable trailer 700. Kingpin 702 is disposed on bottom surface 711 and on alignment axis 720 of interface member 710. Connection roller 20 is disposed on bottom surface 711 and on alignment axis 720. Connection roller 20 is spaced apart from kingpin 702, and occupies the same general location as wedge 714 of FIG. 6. Connection roller 20 rotates about a central bearing and is shaped and dimensioned to rollably engage (rolls against) slot 504 in fifth wheel 502 (refer to FIG. 10). When tractor 500 is backed up to connect to steerable trailer 700 (in the direction of the arrow), connection roller 20 rollably engages fifth wheel 502 and guides kingpin 702 into slot 504 of fifth wheel 502 (refer to FIG. 10).

Figure 10:
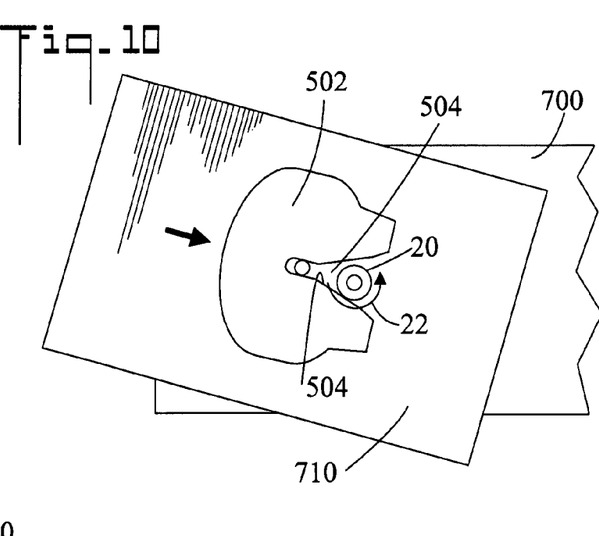
FIG. 10 is an enlarged bottom plan view of the connection roller rollably engaging the fifth wheel.

FIG. 10 is an enlarged bottom plan view of connection roller 20 rollably engaging fifth wheel 502 during the re-connection process. Connection roller 20 makes up for any slight variance in alignment between fifth wheel 502 and kingpin 702/connection roller 20. Rather than possibly binding as can wedge 714 of FIG. 7, connection roller 20 rolls interface member 710 into alignment with fifth wheel 502 and thereby assures a speedy first-time connection. Connection roller 20 is shown rolling counterclockwise in direction 22 as it encounters the side of slot 504 as fifth wheel 502 moves in the direction of the arrow.

Figure 11:
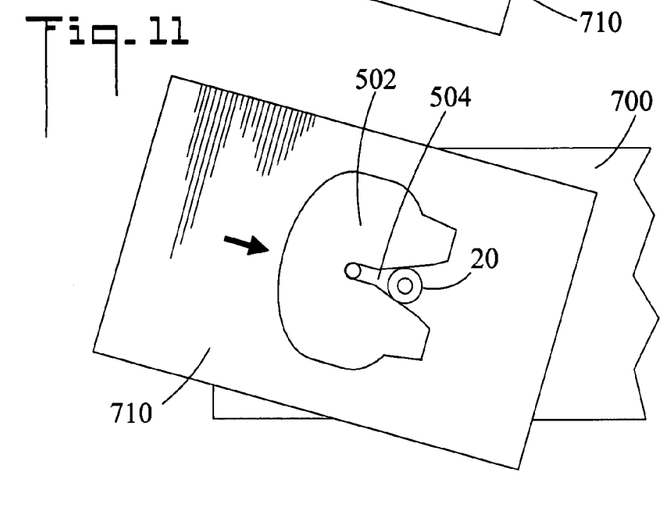
FIG. 11 is an enlarged bottom plan view of the connection roller fully connected to the fifth wheel.

FIG. 11 is an enlarged bottom plan view of connection roller 20 fully connected to fifth wheel 502. Just like wedge 714 of FIG. 8, connection roller locks interface member 710 and fifth wheel 502 together, so that when tractor 500 turns interface member 710 also turns (refer also to FIGS. 12 and 13).

Figure 12:
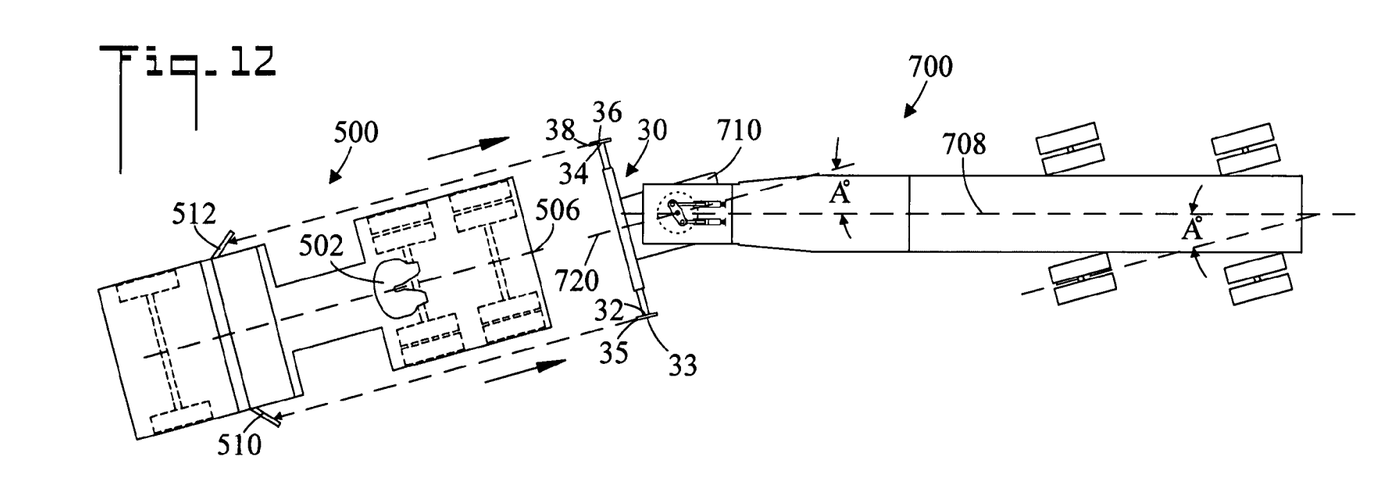
FIG. 12 is a top plan view of an alignment guide in accordance with the present invention.
Figure 13:
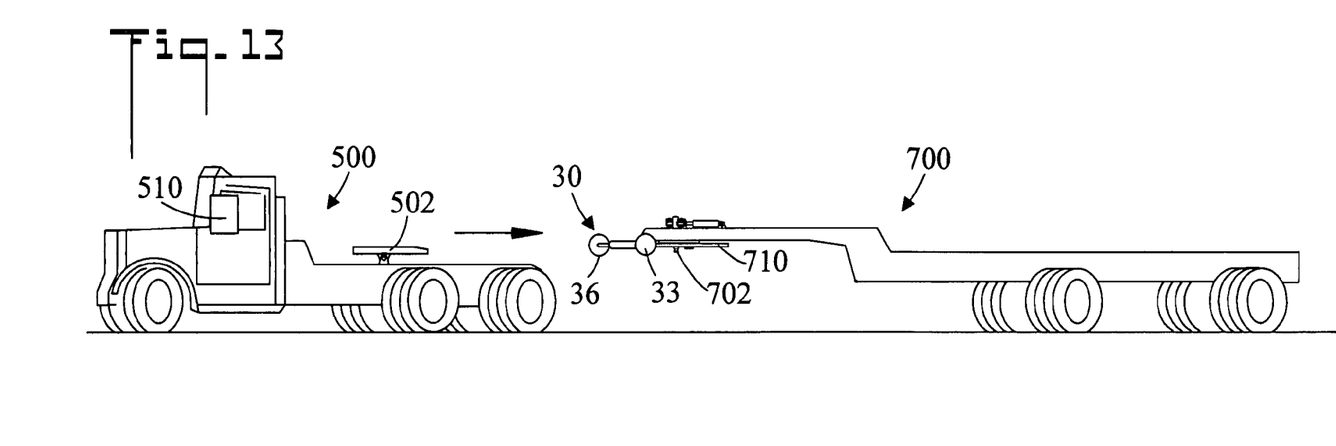
FIG. 13 is a side elevation view of the alignment guide.
Figure 14:
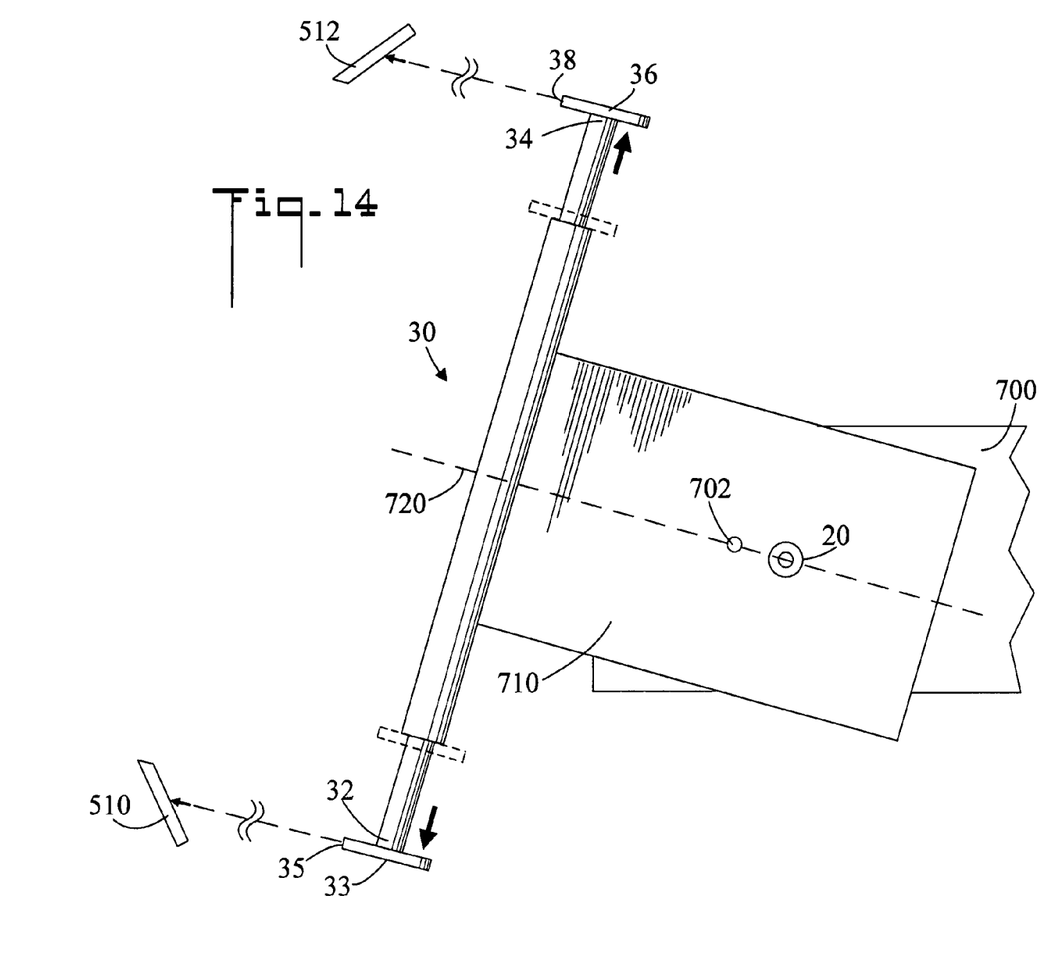
FIG. 14 is an enlarged bottom plan view of the alignment guide.

FIGS. 12 and 13 are top plan and side elevation views respectively of an alignment guide in accordance with the present invention, generally designated as 30. FIG. 14 is an enlarged bottom plan view of alignment guide 30. Alignment guide 30 comprises another embodiment of the trailer alignment system of the present invention. Alignment guide 30 is disposed on interface member 710 and is oriented perpendicular to alignment axis 720 of interface member 710. In the shown embodiment, alignment guide 30 is rod-shaped and is located on the front (tractor side) of interface member 710). Alignment guide 30 has a first end 32 which outwardly projects from interface member 710, and an opposite second end 34 which outwardly projects in an opposite direction from interface member 710.

Alignment guide 30 serves as a guide for the driver of tractor 500 as tractor 500 is backed up to connect to steerable trailer 700. Tractor 500 has a central axis 506. During back up, the driver uses first 32 and second 34 ends of alignment guide 30 as a guide, so that central axis 506 of tractor 500 is aligned (i.e. collinear) with alignment axis 720 of interface member 710. That is, alignment guide 30 facilitates the alignment of tractor 500 and interface member 700, and thereby the connection of kingpin 702 to fifth wheel 502.

First 32 and second 34 ends of alignment guide 30 are selectively extendable so that they can be extended to provide the tractor driver with better visibility during the connection process.

In another embodiment, first 32 and second 34 ends of alignment guide 30 each include a planar member (circular as shown). The planar members assist in the alignment process, since during proper alignment only the edges of the planar members should be visible.

In another embodiment, tractor 500 has a first side view mirror 510 (driver's side) and an opposite second side view mirror 512 (passenger side). First end 32 of alignment guide 30 has a first planar member 33 having a first edge 35, first planar member 33 being oriented parallel to alignment axis 720 of interface member 710. Similarly, second end 34 of alignment guide 30 has a second planar member 36 having a second edge 38, second planar member 36 being oriented parallel to alignment axis 720 of interface member 710. During the reconnection process, trailer 500 is positioned by the driver so that a "straight on image" of first edge 35 appears in first side view mirror 510, and a "straight on" image of second edge 38 appears in second side view mirror 512. A "straight on" image means that the driver sees the edges but not the planar surfaces of the planar members. The driver aligns tractor 500 so that only the edges of the planar members are visible thereby assuring that the central axis 506 of tractor 503 is aligned with alignment axis 720 of interface member 710. In FIGS. 12 and 14, the paths of the images of first edge 35 and second edge 38 to first side view mirror 510 and second side view mirror 512 respectively are shown with dashed lines.

In terms of use, a method for aligning a tractor 500 with a steerable trailer 700 includes: (refer to FIGS. 1-14)

(a) providing a tractor 500 having a central axis 506 and a fifth wheel 502 having a slot 504;

(b) providing a steerable trailer 700 having a trailer alignment system including;
   an interface member 710 having a bottom surface 711 and an alignment axis 720, interface member 710 rotatably connected to streerable trailer 700;
   a kingpin 702 disposed on bottom surface 711 and on alignment axis 720 of interface member 710;
   an alignment guide 30 disposed on interface member 710, alignment guide 30 oriented perpendicular to alignment axis 720 of interface member 710,
   alignment guide 30 having a first end 32 which outwardly projects from interface member 710, and an opposite second end 34 which outwardly projects in an opposite direction from interface member 710;

(c) using first 32 and second 34 ends of alignment guide 30 as a guide, backing up tractor 500 toward interface member 710 so that central axis 506 of tractor 500 is aligned with alignment axis 720 of interface member 710; and, (d) continuing to back up tractor 500 until kingpin 702 is received and locked in place in slot 504 of fifth wheel 502.

The method further including:
in step (b), first 32 and second 34 ends of alignment guide 30 being selectively extendable; and,
prior to step (c), extending first 32 and second 34 ends of alignment guide 30.

The method further including:
in step (a), tractor 500 having a first side view mirror 510 and an opposite second side view mirror 512;

in step (b), first end 32 of alignment guide 30 having a first planar member 33 having a first edge 35, first planar 33 member being oriented parallel to alignment axis 720 of interface member 710, and second end 34 of alignment guide 30 having a second planar member 36 having a second edge 38, second planar 38 member being oriented parallel to alignment axis 720 of interface member 710; and, in step (c), positioning tractor 500 so that a straight on image of first edge 35 appears in first side view mirror 510, and a straight on image of second edge 38 appears in second side view mirror 512.

The method further including:
in step (b), a connection roller 20 disposed on bottom surface 711 and on alignment axis 720 of interface member 710, connection roller 20 spaced apart from kingpin 702, connection roller 20 shaped and dimensioned to rollably engage fifth wheel 502; and, in step (d), connection roller 20 rollably engaging fifth wheel 502 and guiding kingpin 702 into slot 504 of fifth wheel 502.

The possible embodiments of the trailer alignment method and system described herein are exemplary and numerous modifications, combinations, variations, and rearrangements can be readily envisioned to achieve an equivalent result, all of which are intended to be embraced within the scope of the appended claims. Further, nothing in the above-provided discussions of the trailer alignment method and system should be construed as limiting the invention to a particular embodiment or combination of embodiments. The scope of the invention is best defined by the appended claims.

We claim:

1. A method for aligning a tractor with a steerable trailer, comprising:
   (a) providing a tractor having a central axis and a fifth wheel having a slot;
   (b) providing a steerable trailer, said steerable trailer having a trailer alignment system including;
      an interface member having a bottom surface and an alignment axis, said interface member rotatably connected to said streerable trailer;
      a kingpin disposed on said bottom surface and on said alignment axis of said interface member;
      an alignment guide disposed on said interface member, said alignment guide oriented perpendicular to said alignment axis of said interface member,
      said alignment guide having a first end which outwardly projects from said interface member, and an opposite second end which outwardly projects in an opposite direction from said interface member;
   (c) using said first and second ends of said alignment guide as a guide, backing up said tractor toward said interface member so that said central axis of said tractor is aligned with said alignment axis of said interface member; and,
   (d) continuing to back up said tractor until said kingpin is received and locked in place in said slot of said fifth wheel.

2. The method of claim 1, further including:
   in step (b), said first and second ends of said alignment guide being selectively extendable; and,
   prior to step (c), extending said first and second ends of said alignment guide.

3. The method of claim 1, further including:
   in step (a), said tractor having a first side view mirror and an opposite second side view mirror;
   in step (b), said first end of said alignment guide having a first planar member having a first edge, said first planar member being oriented parallel to said alignment axis of said interface member, and said second end of said alignment guide having a second planar member having a second edge, said second planar member being oriented parallel to said alignment axis of said interface member; and, in step (c), positioning said tractor so that a straight on image of said first edge appears in said first side view mirror, and a straight on image of said second edge appears in said second side view mirror.

4. The method of claim 1, further including:

in step (b), a connection roller disposed on said bottom surface and on said alignment axis of said interface member, said connection roller spaced apart from said kingpin, said connection roller shaped and dimensioned to rollably engage said fifth wheel; and, in step (d), said connection roller rollably engaging said fifth wheel and guiding said kingpin into said slot of said fifth wheel.

5. A trailer alignment system for a steerable trailer which is towed by a tractor, the tractor having a fifth wheel having a slot, the trailer alignment system comprising:

an interface member having a bottom surface and an alignment axis, said interface member rotatably connected to the streerable trailer;

a kingpin disposed on said bottom surface and on said alignment axis of said interface member;

a connection roller disposed on said bottom surface and on said alignment axis, said connection roller spaced apart from said kingpin, said connection roller shaped and dimensioned to rollably engage said fifth wheel; and, when the tractor is backed up to connect to the steerable trailer, said connection roller rollably engages the fifth wheel and guides said kingpin into the slot of the fifth wheel.

6. The alignment system according to claim 5, further including;

an alignment guide disposed on said interface member, said alignment guide oriented perpendicular to said alignment axis of said interface member, and, said alignment guide having a first end which outwardly projects from said interface member, and an opposite second end which outwardly projects in an opposite direction from said interface member.

7. The alignment system according to claim 6, further including:

said first and second ends of said alignment guide being selectively extendable.

8. The alignment system according to claim 6, further including:

said first end of said alignment guide having a first planar member having a first edge, said first planar member being oriented parallel to said alignment axis of said interface member; and, said second end of said alignment guide having a second planar member having a second edge, said second planar member being oriented parallel to said alignment axis of said interface member.

9. The alignment system according to claim 6, further including;

an alignment guide disposed on said interface member, said alignment guide oriented perpendicular to said alignment axis of said interface member, said alignment guide having a first end which outwardly projects from said interface member, and an opposite second end which outwardly projects in an opposite direction from said interface member;

said first and second ends of said alignment guide being selectively extendable;

said first end of said alignment guide having a first planar member having a first edge, said first planar member being oriented parallel to said alignment axis of said interface member; and, said second end of said alignment guide having a second planar member having a second edge, said second planar member being oriented parallel to said alignment axis of said interface member.

10. A trailer alignment system for aligning a tractor with a steerable trailer, the trailer alignment system comprising: a tractor having a central axis and a fifth wheel having a slot; a steerable trailer connectable to said tractor; an interface member having a bottom surface and an alignment axis, said interface member rotatably connected to said steerable trailer; a kingpin disposed on said bottom surface and on said alignment axis of said interface member; an alignment guide disposed on said interface member, said alignment guide oriented perpendicular to said alignment axis of said interface member, and, said alignment guide having a first end which outwardly projects from said interface member, and an opposite second end which outwardly projects in an opposite direction from said interface member.

11. The alignment system according to claim 10, further including:

said first and second ends of said alignment guide being selectively extendable.

12. The alignment system according to claim 10, further including:

said first end of said alignment guide having a first planar member having a first edge, said first planar member being oriented parallel to said alignment axis of said interface member; and, said second end of said alignment guide having a second planar member having a second edge, said second planar member being oriented parallel to said alignment axis of said interface member.

* * * * *